United States Patent
Shah et al.

(10) Patent No.: US 7,765,154 B2
(45) Date of Patent: Jul. 27, 2010

(54) METHODS AND APPARATUS FOR FUNDING TRANSACTIONS USING DEBIT CARDS ISSUED BY ONE INSTITUTION AND FUNDS FROM ACCOUNTS AT OTHER INSTITUTIONS

(75) Inventors: Dimple B. Shah, Mill Valley, CA (US); Takatsugu Terachi, Alameda, CA (US)

(73) Assignee: eBay Inc., San Jose, CA (US)

( * ) Notice: Subject to any disclaimer, the term of this patent is extended or adjusted under 35 U.S.C. 154(b) by 32 days.

(21) Appl. No.: 12/050,631

(22) Filed: Mar. 18, 2008

(65) Prior Publication Data

US 2008/0162342 A1 Jul. 3, 2008

Related U.S. Application Data

(63) Continuation of application No. 11/432,840, filed on May 12, 2006.

(51) Int. Cl.
 *G06Q 40/00* (2006.01)
(52) U.S. Cl. .......................... 705/39; 705/40
(58) Field of Classification Search .............. 705/39–40
 See application file for complete search history.

(56) References Cited

U.S. PATENT DOCUMENTS

2002/0002532 A1* 1/2002 Tso ............................. 705/39

2006/0235758 A1* 10/2006 Schleicher ..................... 705/26

OTHER PUBLICATIONS

"U.S. Appl. No. 11/432,840 Non-Final Office Action mailed Apr. 7, 2008.", OARN, 7 pgs.
"U.S. Appl. No. 12/050,631 Non-Final Office Action mailed Apr. 7, 2008.", OARN, 7 pgs.
U.S. Appl. No. 11/432,840 Response filed Aug. 7, 2008 to Non Final Office Action mailed Apr. 7, 2008, 7 pgs.
U.S. Appl. No. 11/432,840 Response filed Mar. 17, 2009 to Non-Final Office Action mailed Nov. 17, 2009, 12 pgs.
U.S. Appl. No. 11/432,840 Non-Final Office Action mailed on Nov. 17, 2008, 8 pgs.
U.S. Appl. No. 11/432,840, Final Office Action mailed Jun. 26, 2009, 8 pgs.
U.S. Appl. No. 11/432,840, Response filed Sep. 25, 2009 to Final Office Action mailed Jun. 26, 2009, 12 pgs.

* cited by examiner

*Primary Examiner*—Thu Thao Havan
(74) *Attorney, Agent, or Firm*—Schwegman, Lundberg & Woessner, P.A.

(57) ABSTRACT

Methods and apparatus for funding transactions are presented herein. In one embodiment, the apparatus includes an account information unit to store information about an account, the account being associated with a first financial institution. The apparatus can also include a transaction processor to receive a request for a debit amount, to determine that the account is associated with one or more funding sources, and to determine if the one or more funding sources authorize the request for the debit amount. The one or more funding sources are associated with one or more financial institutions other than the first financial institution.

31 Claims, 10 Drawing Sheets

METHODS AND APPARATUS FOR FUNDING TRANSACTIONS USING DEBIT CARDS ISSUED BY ONE INSTITUTION AND FUNDS FROM ACCOUNTS AT OTHER INSTITUTIONS

RELATED APPLICATION

The present application is a continuation of U.S. patent application Ser. No. 11/432,840 filed on May 12, 2006 and entitled "METHODS AND APPARATUS FOR FUNDING TRANSACTIONS", which application is incorporated herein by reference in its entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2008, eBay, Inc.

FIELD

This invention relates generally to the field of financial transaction processing and more particularly to the field of financial systems that provide backup funding.

BACKGROUND

In today's high-technology economy, banks, credit card companies, and other financial institutions provide various facilities for enabling their account holders to fund transactions. For example, banks provide checks, debit cards, and electronic drafting to enable their account holders to pay for goods, services, and other transactions. Similarly, credit card companies provide their account holders with credit cards for funding transactions online, in retail stores, over the telephone, or in other ways. However, even though account holders have many payment methods at their disposal, they are often concerned about having enough money/credit in their accounts to complete their transactions.

BRIEF DESCRIPTION OF THE FIGURES

Embodiments of the invention are illustrated by way of example and not limitation in the Figures of the accompanying drawings in which.

DETAILED DESCRIPTION OF THE EMBODIMENTS

This description of the embodiments describes methods and apparatus for funding transactions. This description is divided into five sections. The first section provides an introduction, while the second section describes an example system architecture. The third section describes example operations and the fourth section describes an example system architecture. The fifth section presents some general comments.

Introduction

Many financial institutions offer their account holders debit cards for use in paying for goods and services. When an account holder attempts to fund a transaction using a debit card, the account holder's financial institution determines whether the account holder's account balance is less than the transaction amount. If the account does not have enough money to cover the transaction, the account holder's financial institution may deny the transaction. However, embodiments of the invention enable account holders to configure their accounts to draw from one or more backup funding sources when their accounts do not have enough money to cover debit transactions. The backup funding sources can include credit lines, credit cards, checking accounts, savings accounts, or any other funding source. The backup funding sources can be associated with different financial institutions. For example, assume that an account holder has a debit account at First National Bank and a credit account at Mega Bank, where First National Bank and Mega Bank are two different financial institutions. In one embodiment, the account holder can configure the First National Bank debit account to acquire backup funding from the Mega Bank credit account. The following discussion of FIG. 1 explains some of these features.

Figure 1:
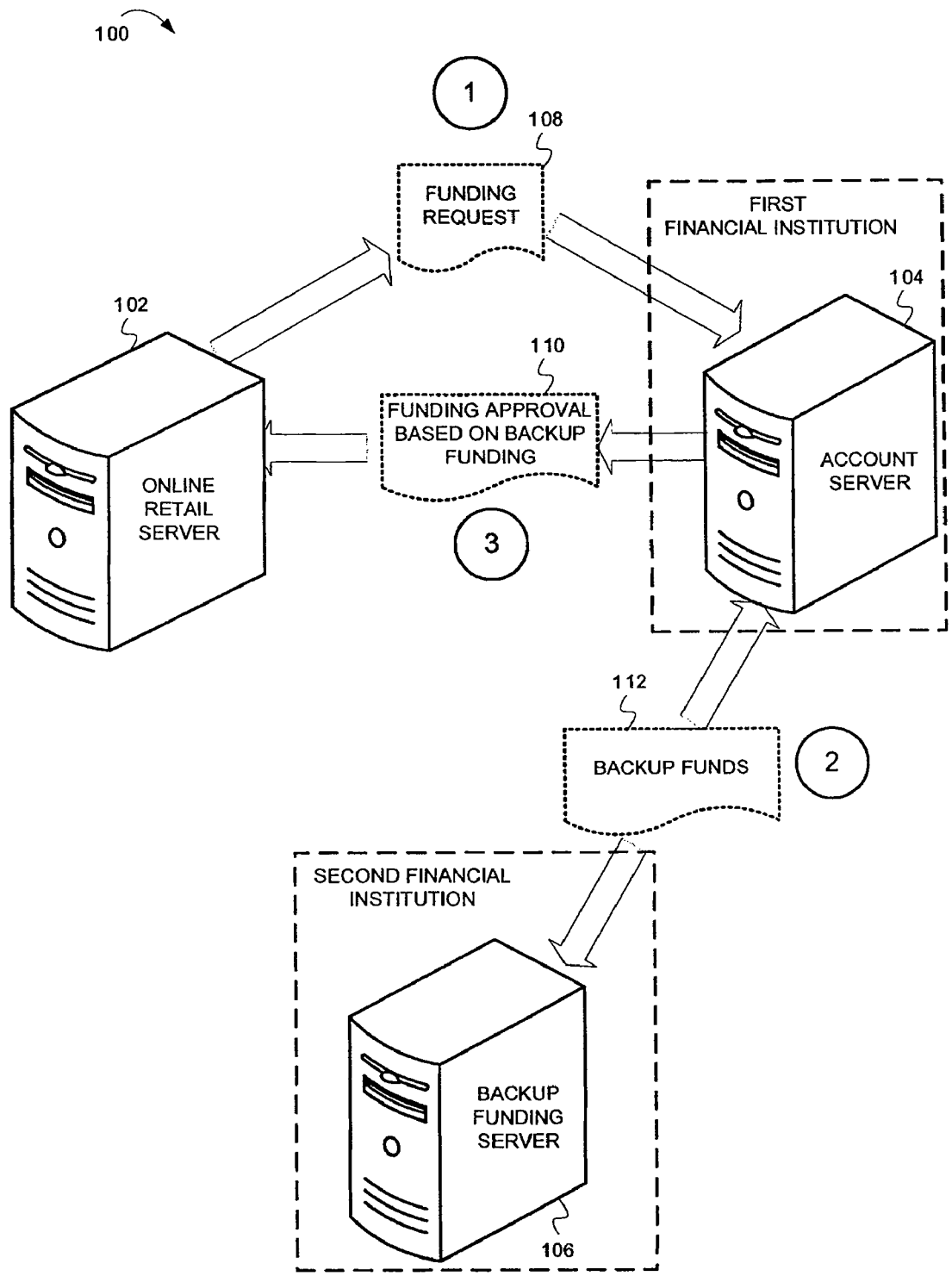
FIG. 1 is a dataflow diagram illustrating dataflow and operations in a system for providing backup funding in financial transactions, according to example embodiments of the invention.

FIG. 1 is a dataflow diagram illustrating dataflow and operations in a system for providing backup funding in financial transactions, according to example embodiments of the invention. In FIG. 1, the system 100 includes an online retail server 102, account server 104, and backup funding server 106. As shown in FIG. 1, the account server 104 processes account transactions associated with a first financial institution, while a backup funding server 106 processes account transactions associated with a second financial institution.

The dataflow and operations occur in three stages. During stage one, a consumer initiates a transaction in which the consumer uses a debit card associated with a debit account to purchase goods from an online retail web site. For example, a consumer who has a $75 debit account balance at the first financial institution buys retail goods for $100. The consumer also has a $500 credit line at a second financial institution, which uses the backup funding server 106 to process its credit line transactions. As part of the transaction, the online retail server 102 transmits a funding request 108 (e.g., for $100) to the account server 104.

During stage two, the account server 104 determines that the consumer's account balance (e.g. $75) will not be enough to pay for the goods. As a result, the account server 104 acquires backup funds 112 (i.e., $25) from the backup funding server 106. As noted above, the account server 104 and backup funding server 106 each process account transactions for different financial institutions.

During stage three, the account server 104 transmits funding approval 110 to the online retail server 102. After receiving funding approval, the online retail server 102 approves the sale of goods to the consumer.

The following sections describe these and other features of the embodiments.

Example System Architecture

This section describes an example system architecture. Operations performed by embodiments of the system architecture will be described in greater detail in the next section.

Figure 2:
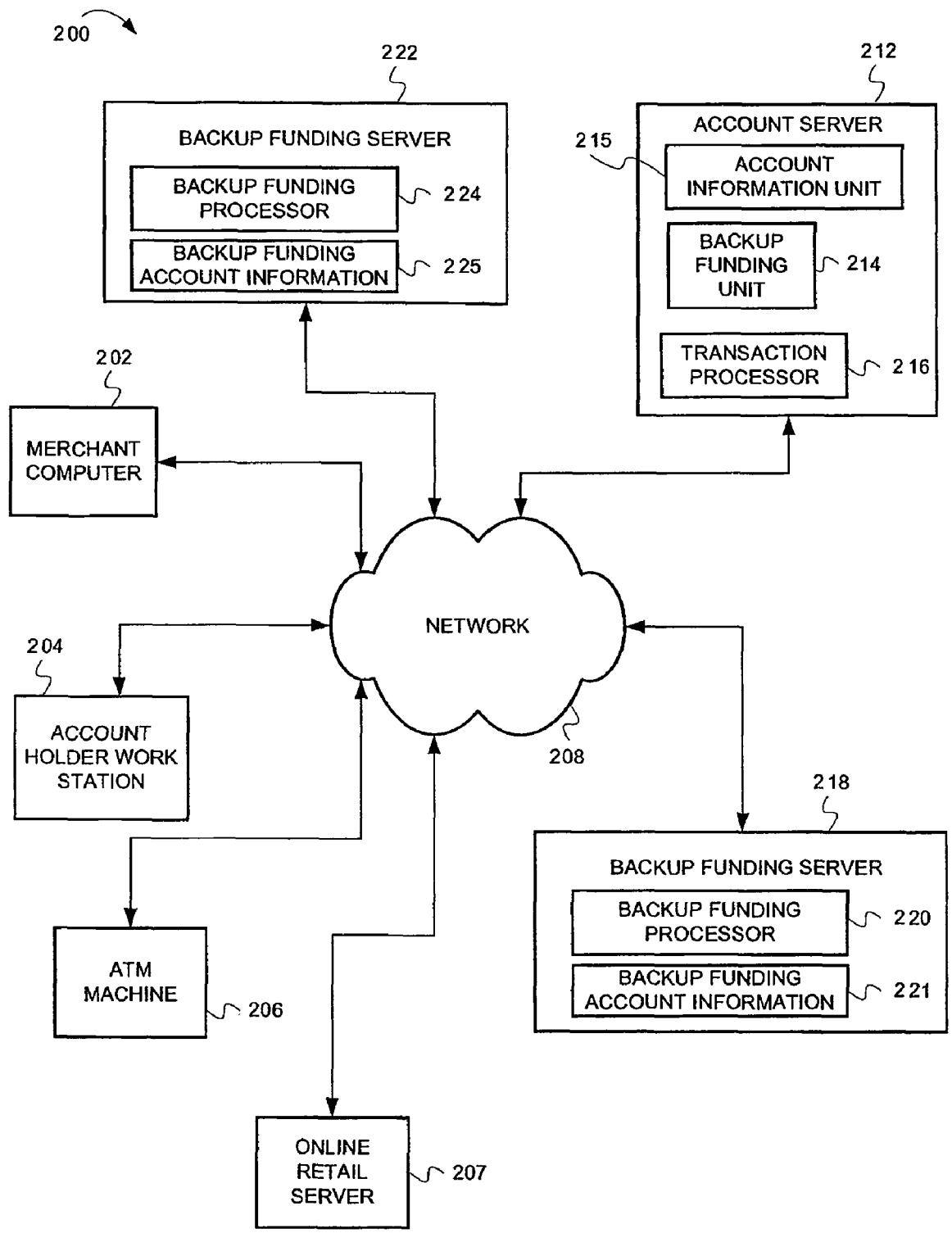
FIG. 2 is a block diagram illustrating a backup funding system architecture, according to example embodiments of the invention.

FIG. 2 is a block diagram illustrating a backup funding system architecture, according to example embodiments of the invention. In FIG. 2, the backup funding system architecture 200 includes a network 208 connected to a merchant computer 202, account holder workstation 204, and automated teller machine (ATM) 206. The network 208 is also connected to an account server 212 and backup funding servers 218 and 222.

The account server 212 includes an account information unit 215, a backup funding unit 214, and a transaction processor 216. The account information unit 215 can include information about account holders (e.g., name, address, telephone number, etc.), account balances, and backup funding configuration information. The transaction processor 216 can process funding requests received from the merchant computer 202, account holder workstation 204, and ATM machine 206. The backup funding unit 214 can inter alia 1) configure accounts to use backup funding associated with different financial institutions; 2) acquire backup funding from funding sources associated with the different financial institutions; and 3) enable account holders to make transaction-time decisions about backup funding sources.

The backup funding servers 218 and 222 include backup funding account information 221 and 225 and backup funding processors 220 and 224. The backup funding account information 221 and 225 can include information about credit accounts, bank accounts, or other accounts from which backup funds can be drawn. In one embodiment, the backup funding account information 221 and 225 can include account holder information (e.g., name, address, etc.), account holder credit limits, and any other suitable account information. The backup funding processors 220 and 224 can process and update the backup funding account information 221 and 225. Additionally, the backup funding processors 220 can also process backup funding requests for transactions associated with the account server 212.

The network 208 can include wired and/or wireless communication links, which can employ any suitable connection technology, such as Bluetooth, 802.11, Ethernet, public switched telephone networks, SONET, etc In one embodiment, any of the components of the system architecture 200 can include hardware, firmware, and/or software for performing the operations described herein. Software can be stored on machine-readable media, which include any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Operations

This section describes operations performed by embodiments of the invention. In the discussion below, the flow diagrams will be described with reference to the block diagrams presented above. However, in some embodiments, the operations can be performed by components different from those shown in the block diagrams. In certain embodiments, the operations are performed by executing instructions residing on machine-readable media (e.g., software), while in other embodiments, the operations are performed by hardware and/or other logic (e.g., firmware). In some embodiments the operations are performed in series, while in other embodiments, the operations can be performed in parallel.

This section presents FIGS. 3-9. This section will continue with a discussion of FIG. 3, which describes how an account can use backup funding sources that are associated with different financial institutions.

Figure 3:
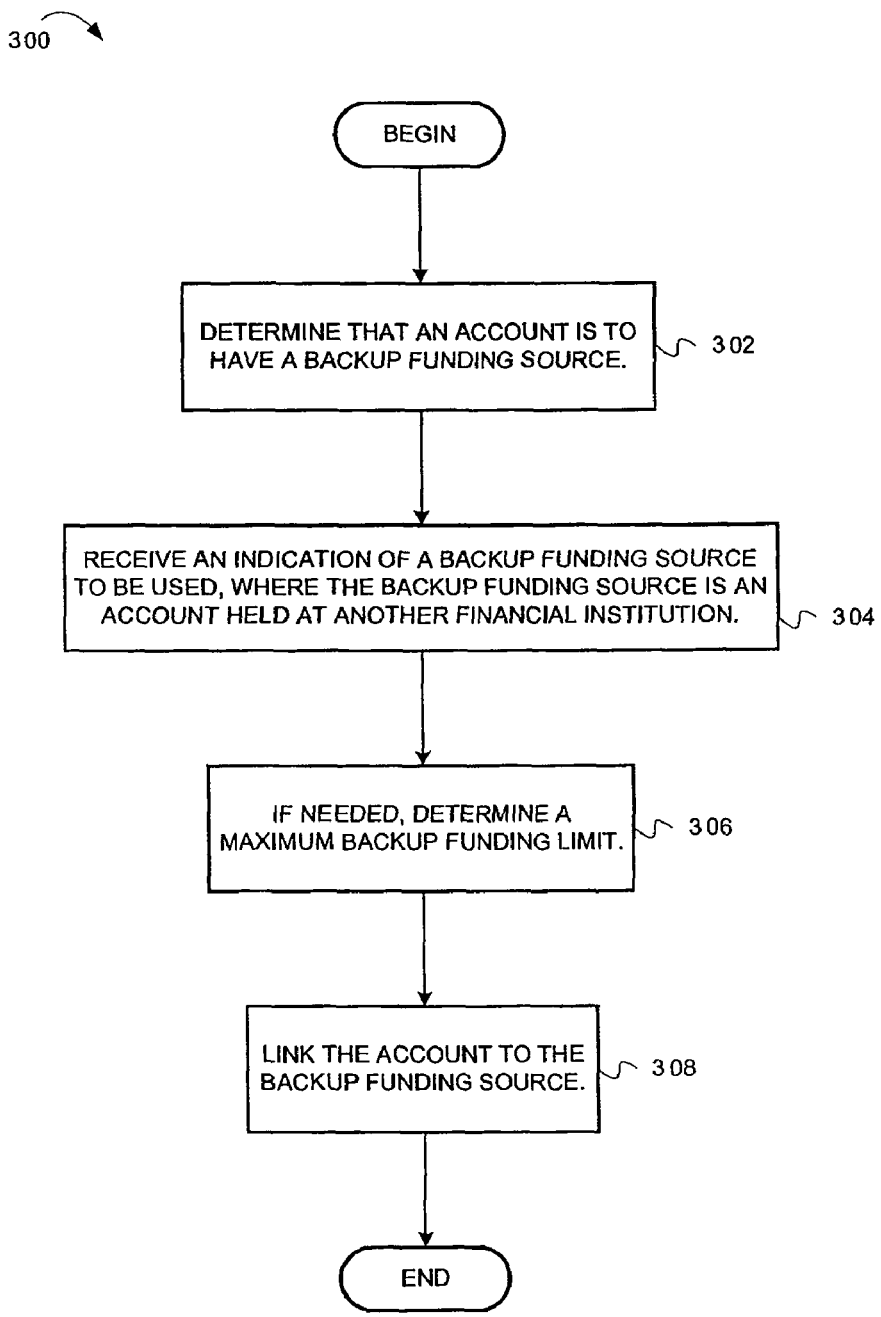
FIG. 3 is a flow diagram illustrating operations for configuring a financial account to use backup funding sources that are associated with different financial institutions, according to example embodiments of the invention.

FIG. 3 is a flow diagram illustrating operations for configuring a financial account to use backup funding sources that are associated with different financial institutions, according to example embodiments of the invention. The flow diagram 300 will be described with reference to the system architecture shown in FIG. 2. The flow begins at block 302.

At block 302, an account server's backup funding unit 214 determines that an account is to have a backup funding source. In one embodiment, the backup funding unit 214 presents a web page or other interface through which an account holder can configure an account's backup funding options. The backup funding unit 214 can present the interface on the account holder workstation 204, ATM machine 206, merchant computer 202, or other suitable device. The flow continues at block 304.

At block 304, the account server's backup funding unit 214 receives an indication of one or more backup funding sources, which can be associated with different financial institutions. In one embodiment, the backup funding unit 214 receives a webpage or other indicia indicating one or more backup funding sources. The backup funding sources can include credit lines, bank accounts, and any other suitable money source. In one embodiment, the account can be accessed by multiple debit cards and different backup funding sources can be configured for each debit card. In one embodiment, the backup funding servers 218 and 222 provide access to the backup funding sources. In one embodiment, if the account holder is not already qualified for certain backup funding sources, the backup funding unit 214 presents an interface through which the account holder can apply for and acquire backup funding sources. The flow continues at block 306.

At block 306, if needed, the backup funding unit 214 determines a maximum backup funding limit. For example, the backup funding unit 214 contacts the backup funding sources to establish maximum backup funding limits. In one embodiment, the account holder can specify a maximum backup funding limit for each backup funding source. The flow continues at block 308.

At block 308, the backup funding unit 214 links the account to the selected backup funding sources. After the account is linked to the backup funding sources, if a fund request exceeds the account balance, the backup funding unit 214 can attempt to acquire the needed funds from one or more of the backup sources. In one embodiment, linking the account to the selected backup funding source includes storing information for accessing to the backup funding source. The access information can include an account number for the backup funding source, an expiration date for the backup funding source, an account holder username and password for the backup funding source, and/or a routing number for the backup funding source. From block 308, the flow ends.

While FIG. 3 describes operations for configuring an account's backup funding sources, this section continues with a discussion about how backup funding can be acquired in the course of a payment transaction.

Figure 4:
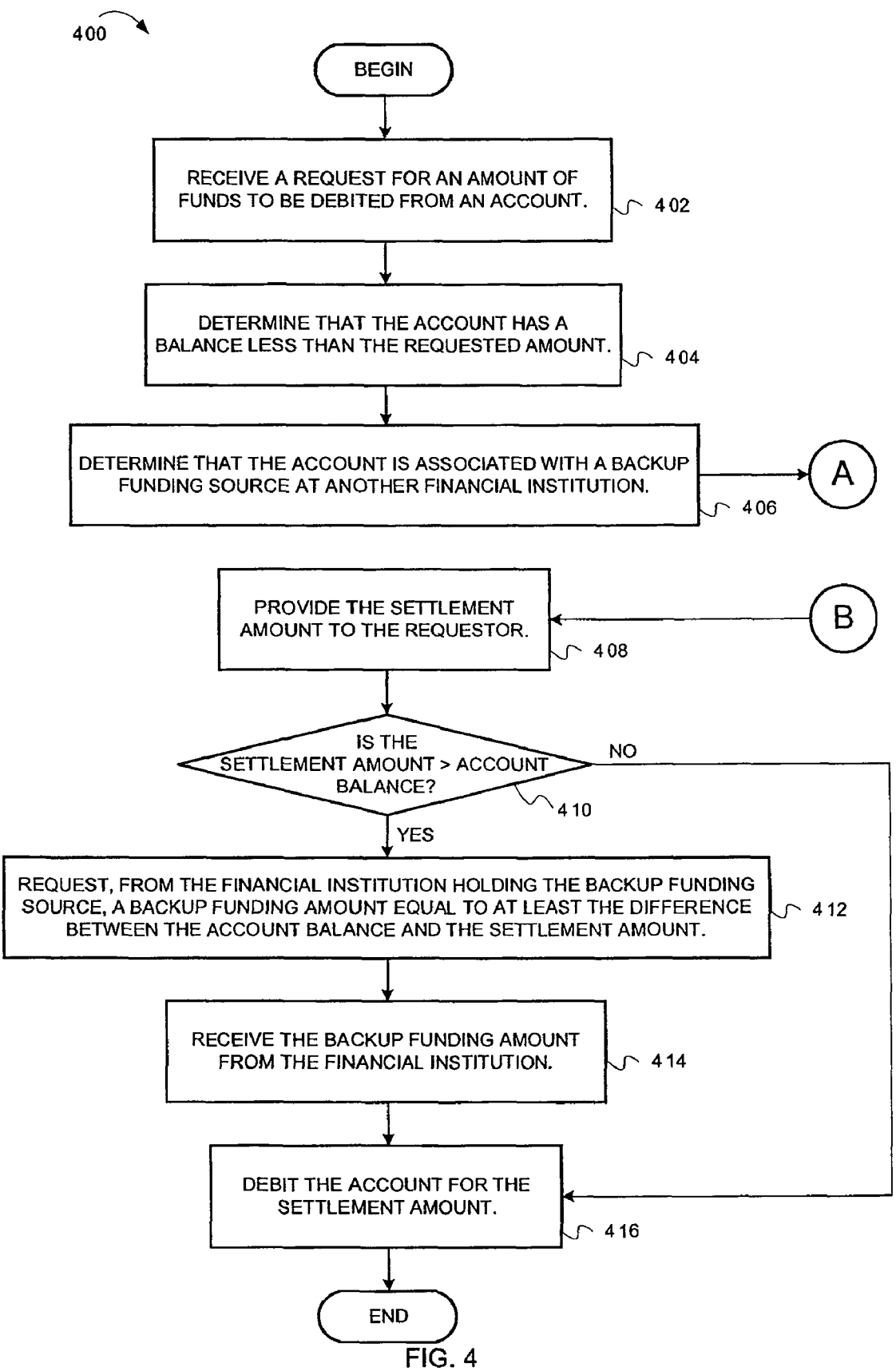
FIG. 4 is a flow diagram illustrating operations for acquiring backup funding for a financial transaction, according to example embodiments of the invention.

FIG. 4 is a flow diagram illustrating operations for acquiring backup funding for a financial transaction, according to example embodiments of the invention. The flow 400 begins at block 402.

At block 402, the account server's transaction processor 216 receives a request for funds from an account. For example, the transaction processor 216 receives a request for $150. The request for funds can be part of an in-store retail sale, online retail sale, ATM account withdrawal, or any other transaction requiring funds to be drawn from an account serviced by the account server 212. In one embodiment, the request for funds originates at the merchant computer 202, ATM machine 206, or the online retail server 207. The flow continues at block 404.

At block 404, the transaction processor 216 determines that the account has a balance less than the requested amount. For example, the transaction processor 216 determines that the account balance is $100, while the funds request is for $150. The flow continues at block 406.

At block 406, the transaction processor 216 determines that the account is associated with one or more backup funding sources from one or more other financial institutions. In one embodiment, the transaction processor 216 makes this determination based on information in the account information unit 215, where the information specifies one or more backup funding sources associated with the account. As noted above, the backup funding sources can be credit lines, bank accounts, or other financial accounts available from different financial institutions. In one embodiment, the backup funding servers 218 and 222 and the account server 212 are operated by different financial institutions (i.e., different business entities). From block 406, the flow continues at "A".

Figure 5:
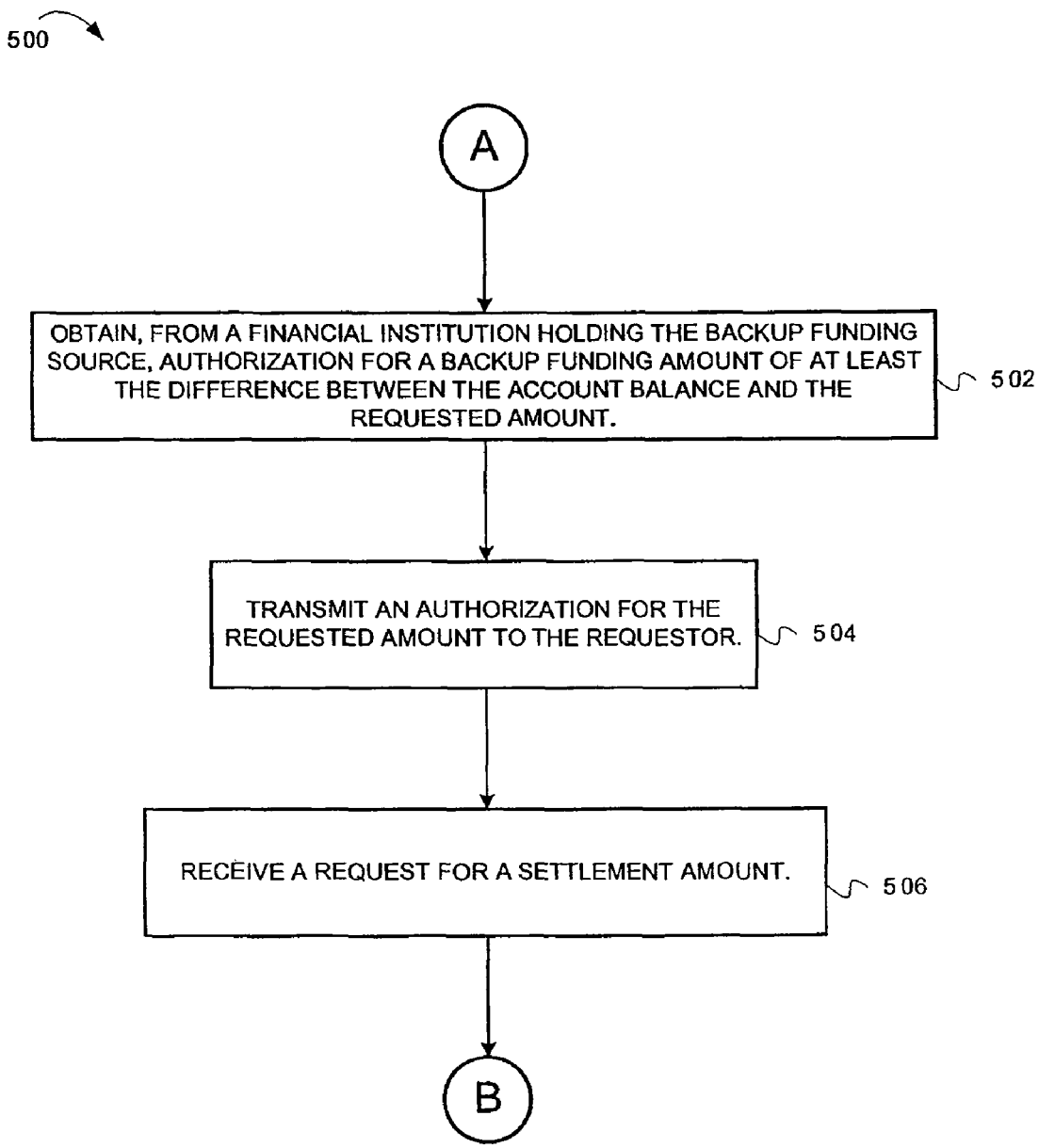
FIG. 5 is a flow diagram illustrating operations for processing authorizations and settlement requests as part of an acquisition of backup funding, according to example embodiments of the invention.

In one embodiment, "A" flows into block 502 of FIG. 5. This discussion will move-on to the operations shown in FIG. 5, which describe how embodiments obtain authorization from backup funding sources.

FIG. 5 is a flow diagram illustrating operations for processing authorizations and settlement requests as part of an acquisition of backup funding, according to example embodiments of the invention. In FIG. 5, the flow 500 moves from "A" to block 502.

At block 502, the account server's backup funding unit 214 obtains authorization for a backup funding amount of at least the difference between the account balance and the requested amount. In one embodiment, the account server's backup funding unit 214 receives the authorization from a financial institution that is different from the one operating the account server 212. In continuing the example from above ($100 account balance and $150 funds request), the backup funding unit 214 obtains authorization for backup funding in an amount of $50. In one embodiment, the backup funding unit 214 obtains the backup funding amount from one of the backup funding servers 218 or 222, each of which is associated with a financial institution different from that of the account server 212. The flow continues at block 504.

At block 504, an account server's transaction processor 216 transmits to the requestor an authorization for amount requested at block 402. In one embodiment (not shown), the backup funding unit 214 may not receive authorization for the backup funding amount (see discussion of block 502). If the backup funding unit 214 does not obtain authorization for the backup funding amount, the transaction processor 216 transmits to the requestor a denial associated with the requested amount. The flow continues at block 506.

At block 506, an account server's transaction processor 216 receives a request for a settlement amount. In one embodiment, the request for the settlement amount is associated with the authorization for the requested funds from block 402 and is received from the merchant computer 202, online retail server 207, or other suitable computer. In one embodiment, the request for the settlement amount is received after a period of time has passed. For example, the request for the settlement amount is received at the end of the business day. In one embodiment, if the request for the settlement amount is not received within a specified amount of time (e.g. 10 days), the authorization from block 402 is released. The settlement amount can differ from the requested amount (see block 402). In one embodiment, if the settlement is greater than the requested amount, the account server's backup funding unit 214 acquires additional funds from the backup funding source. From block 506 the flow continues at B, which continues into block 408 of FIG. 4.

This discussion will now follow the flow back to FIG. 4.

In FIG. 4, at block 408, the account server's transaction processor 216 provides the settlement amount (see discussion of block 506) to the requester. In continuing the example from above, the transaction processor 216 provides $150 to the merchant computer 202. The flow continues at block 410.

At block 410, the backup funding unit 214 determines whether the settlement amount is greater than the account balance. If the settlement amount is greater than the account balance, the flow continues at block 412. Otherwise, the flow continues at block 416.

In certain scenarios, the account server 212 may not need to use back funding for which it is authorized to use. One such scenario occurs when an account holder deposits funds into the account after the backup funding authorization is received (502), but before the backup funds are collected (414). If the deposit makes the account balance greater than the settlement amount, the account server 212 will not use the backup funds. Otherwise the account server 212 will use only enough backup funding to settle the transaction.

At block 412, the backup funding unit 214 requests a backup funding amount equal to at least the difference between the account balance and the requested amount. In one embodiment, the backup funding source is held on one of the backup funding servers 218 or 222, which is operated by a different financial institution. The flow continues at block 414.

At block 414, the backup funding unit 214 receives the backup funding amount from one of the backup funding servers 218 or 222. The flow continues at block 416.

At block 416, the transaction processor 216 debits the account for the settlement amount. In one embodiment, the transaction processor 216 updates information in the account information unit 215 to reflect the debit. From block 416, the flow ends.

As discussed above, the flow 400 of FIG. 4 moves through block "A". In one embodiment, "A" flows into FIG. 6.

Figure 6:
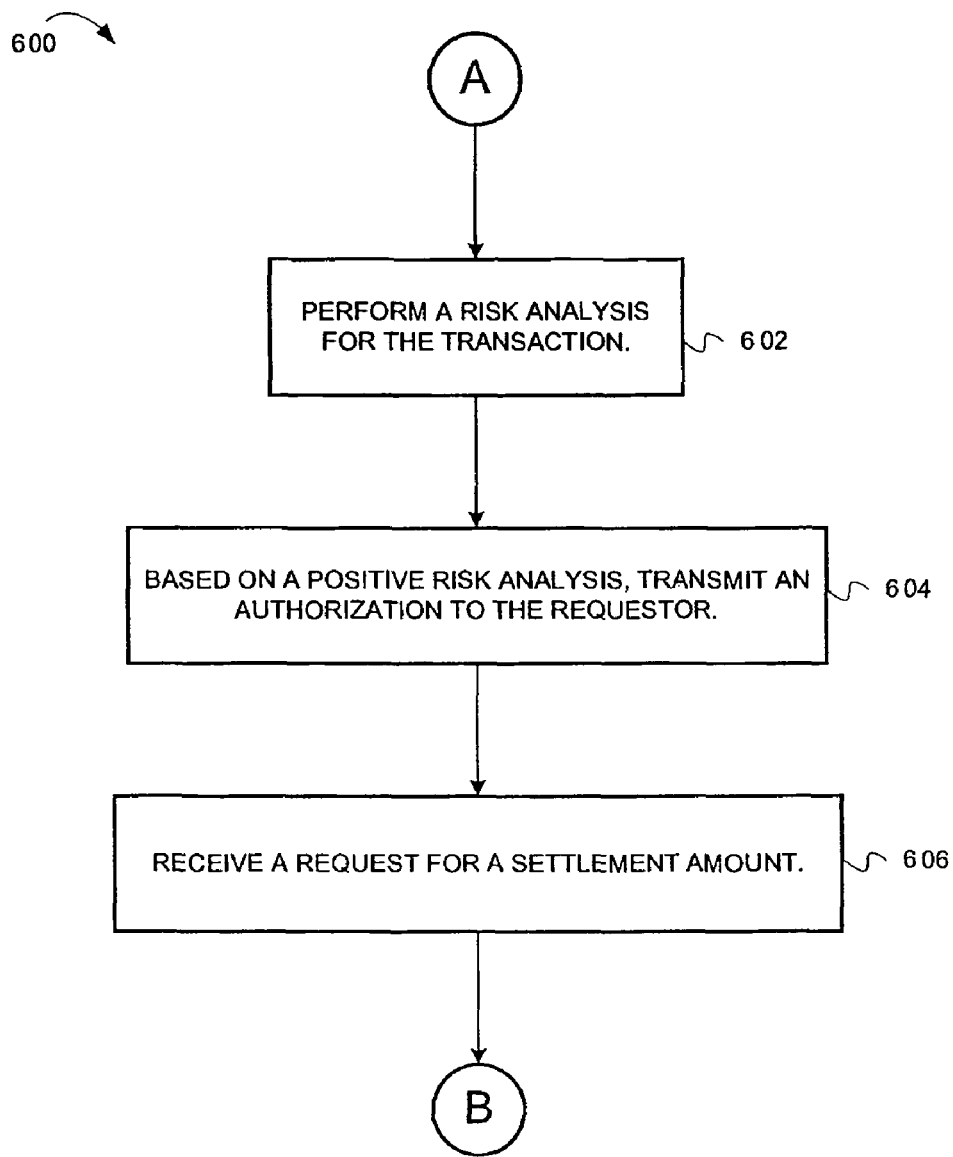
FIG. 6 is a flow diagram illustrating operations for performing a risk analysis as part of an acquisition of backup funding, according to example embodiments of the invention.

FIG. 6 is a flow diagram illustrating operations for performing a risk analysis as part of an acquisition of backup funding, according to example embodiments of the invention. The flow diagram 600 will be described with reference to the system architecture of FIG. 2. The flow begins at block 602.

At block 602, an account server's transaction processor 216 performs a risk analysis for the transaction. In one embodiment, the risk analysis is based on a transaction time (e.g., time of day), a transaction amount, account holder history (e.g., number of account overdrafts, average account balance, etc.), or other suitable criteria. From block 602, the flow continues at block 604.

At block 604, the account server's transaction processor 216, transmits an authorization to the requestor based on a favorable risk analysis. In one embodiment, if the account server's transaction processor 216 gets a negative result from the risk analysis, the account server's transaction processor 216 transmits a denial. From block 604, the flow continues at block 606.

At block 606, the account server's transaction processor 216 receives a request for a settlement amount. In one embodiment, the request is received from merchant computer 202 or online retail server 207. From block 606, the flow continues at B, which flows into block 408 of FIG. 4.

Figure 7:
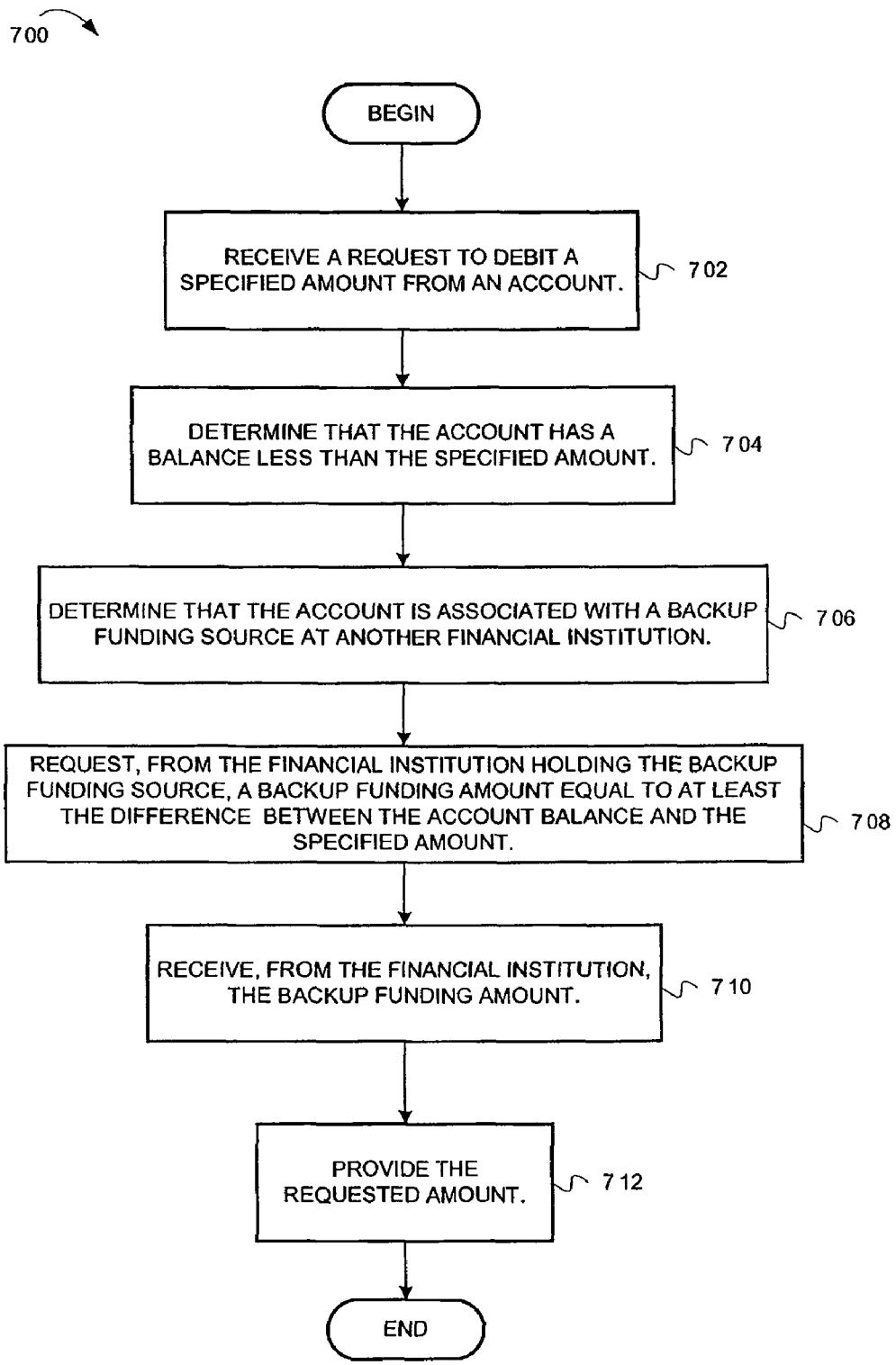
FIG. 7 is a flow diagram illustrating operations for collecting backup funds before paying a financial transaction, according to example embodiments of the invention.

While FIGS. 3-6 describe embodiments that postpone collection of backup funding until after making payment on a transaction, FIG. 7 describes an embodiment that collects backup funds before paying a transaction.

FIG. 7 is a flow diagram illustrating operations for collecting backup funds before paying a financial transaction, according to example embodiments of the invention. The flow diagram 700 will be described with reference to the system architecture shown in FIG. 2. The flow begins at block 702.

At block 702, the account server's transaction processor 216 receives a request for funds from an account. In one embodiment, the request is from a merchant who is selling goods to an account holder (e.g., the online retail server 207). In another embodiment, the request is from the account holder via an ATM machine. The flow continues at block 704.

At block 704, the account server's transaction processor 216 determines that the account has a balance less than the specified amount. The flow continues at block 706.

At block 706, the account server's transaction processor 216 determines that the account is associated with a backup funding source at another financial institution. Although not shown, in one embodiment, if the account server's transaction processor 216 determines that the account is not associated with a backup funding source, the account server's transaction processor 216 denies the request to debit the specified amount from the account. The flow continues at block 708.

At block 708, the account server's backup funding unit 214 requests a backup funding amount equal to at least the difference between the account balance and the specified amount. In one embodiment, the backup funding source is held on one of the backup funding servers 218 or 222, which is operated by a different financial institution. In one embodiment, if the backup funding amount exceeds a maximum backup funding amount associated with the backup funding source, the backup funding unit will not request the backup funding. The flow continues at block 710.

At block 710, the account server's backup funding unit 214 receives the backup funding amount. In one embodiment, the account server's backup funding unit 214 notifies (e.g., via email, instant message, telephone message, etc.) the account holder that the backup funding source has been used. The flow continues at block 712.

At block 712, the account server's transaction processor 216 provides the requested amount. In one embodiment, the requested amount is provided to a merchant or to the account holder via an ATM machine. In one embodiment (not shown), if the financial institution holding the backup funding source denies the request for the backup funding amount, the account server's transaction unit will deny the request to debit the specified amount from the account. From block 712, the flow ends.

Figure 8:
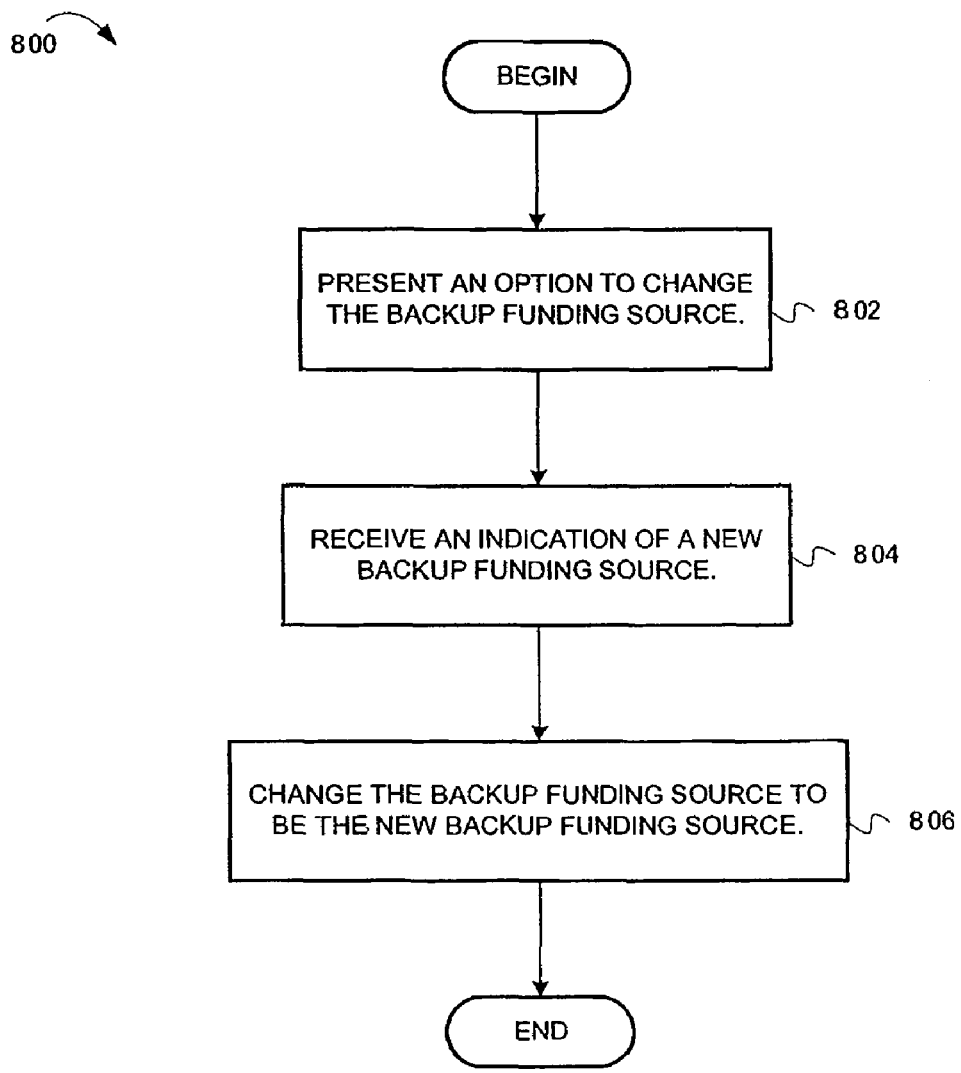
FIG. 8 is a flow diagram illustrating operations for selecting between different backup funding sources, according to example embodiments of the invention.

While FIGS. 4-7 describe operations for acquiring backup funding, FIG. 8 describes operations for enabling an account holder to select different backup funding sources. The operations for selecting different backup funding sources can be used in concert with operations for acquiring backup funding or they can be used separately.

FIG. 8 is a flow diagram illustrating operations for selecting between different backup funding sources, according to example embodiments of the invention. The flow diagram 800 will be described with reference to the system architecture shown in FIG. 2. The flow begins at block 802.

At block 802, an account server's backup funding unit 214 presents an option to change a backup funding source associated with an account. For example, in an online retail transaction in which an account holder is making payment with a debit card, the backup funding unit 214 presents a payment interface (e.g., a web page) that allows the account holder to select a new backup funding source for that retail transaction. Alternatively, the backup funding unit 214 can present the payment interface anytime after the transaction processor 216 determines that backup funding is needed and that the account is associated with backup funding (e.g., after block 406 of FIG. 4). In one embodiment, the account holder can select between previously verified bank accounts, previously verified credit card accounts, and previously verified lines of credit. The flow continues at block 804.

At block 804, the account server's backup funding unit 214 receives a selection indicating a new backup funding source. For example, the backup funding unit 214 receives a backup funding source selection through the payment interface presented at block 802. In one embodiment, the buyer can select more than one backup funding source. From block 804, the flow continues at block 806.

At block 806, the account server's backup funding unit 214 changes the account's backup funding source based on the selection. In one embodiment, the backup funding unit 214 modifies information in the account information unit 215 to reflect the newly selected backup funding source. From block 806, the flow ends.

The discussion so far has been mostly about how embodiments of the system architecture can configure accounts and acquire backup funding for financial transactions. This section will continue with a discussion of how embodiments can process credits (e.g., returns, chargebacks, etc.) associated with transactions for which backup funding has been used. For example, this section will describe how embodiments of the system architecture may process a $100 credit associated with a transaction that drew $75 from an account and $25 from a backup funding source.

Figure 9:
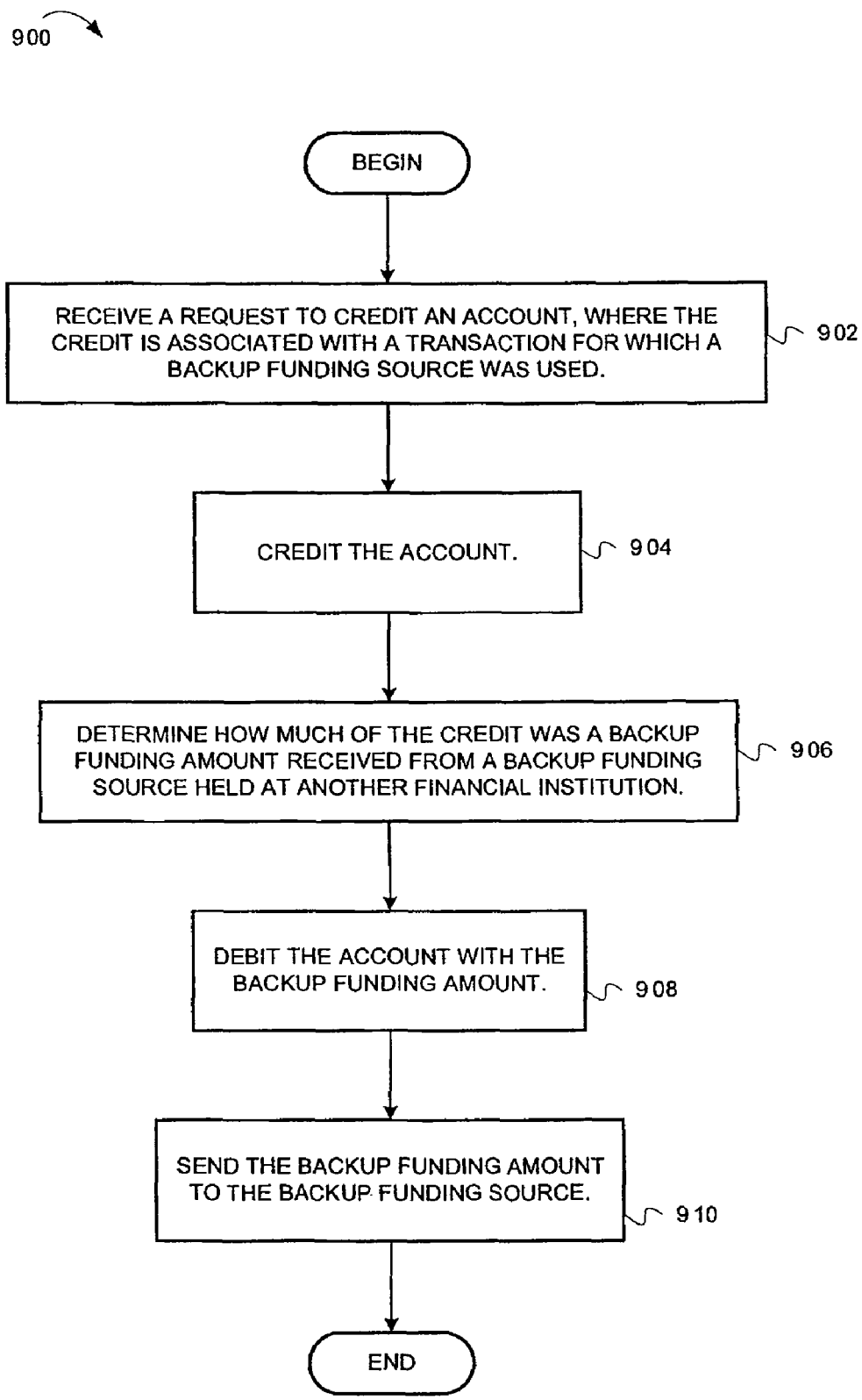
FIG. 9 is a flow diagram illustrating operations for processing credits associated with transactions that used backup funding, according to example embodiments of the invention.

FIG. 9 is a flow diagram illustrating operations for processing credits associated with transactions that used backup funding, according to example embodiments of the invention. The flow diagram 900 will be described with reference to the system architecture shown in FIG. 2. The flow begins at block 902.

At block 902, the account server's transaction processor 216 receives a request to credit an account, where the credit is associated with a transaction for which a backup funding source was used. The credit request can result from a chargeback, return, refund, etc. The flow continues at block 904.

At block 904, the account server's transaction processor 216 credits the account in the amount specified in the credit request. The flow continues at block 906.

At block 906, the account server's backup funding unit 214 determines how much of the credit was a backup funding amount received from a backup funding source held at another financial institution. In one embodiment, the account server's backup funding unit 214 makes this determination based on transaction information stored in the account information unit 215. The flow continues at block 908.

At block 908, the account server's backup funding unit 214 debits the account with the backup funding amount and sends the backup funding amount to the backup funding source. In one embodiment, the account server's backup funding unit 214 begins a new credit transaction with the backup funding source. Alternatively, the account server's backup funding unit 214 can reverse the previous transaction with the backup funding source. In one embodiment, the account server's backup funding unit 214 transmits a notification (e.g., email, voicemail, instant message, etc.) indicating that the backup funding source was credited. From block 910, the flow ends.

Example Server/Workstation

This section describes an example computer architecture that can be used with embodiments of the system architecture described above. For example, embodiments of the backup funding servers, account servers, ATM machines, etc. can utilize the following computer architecture.

Figure 10:
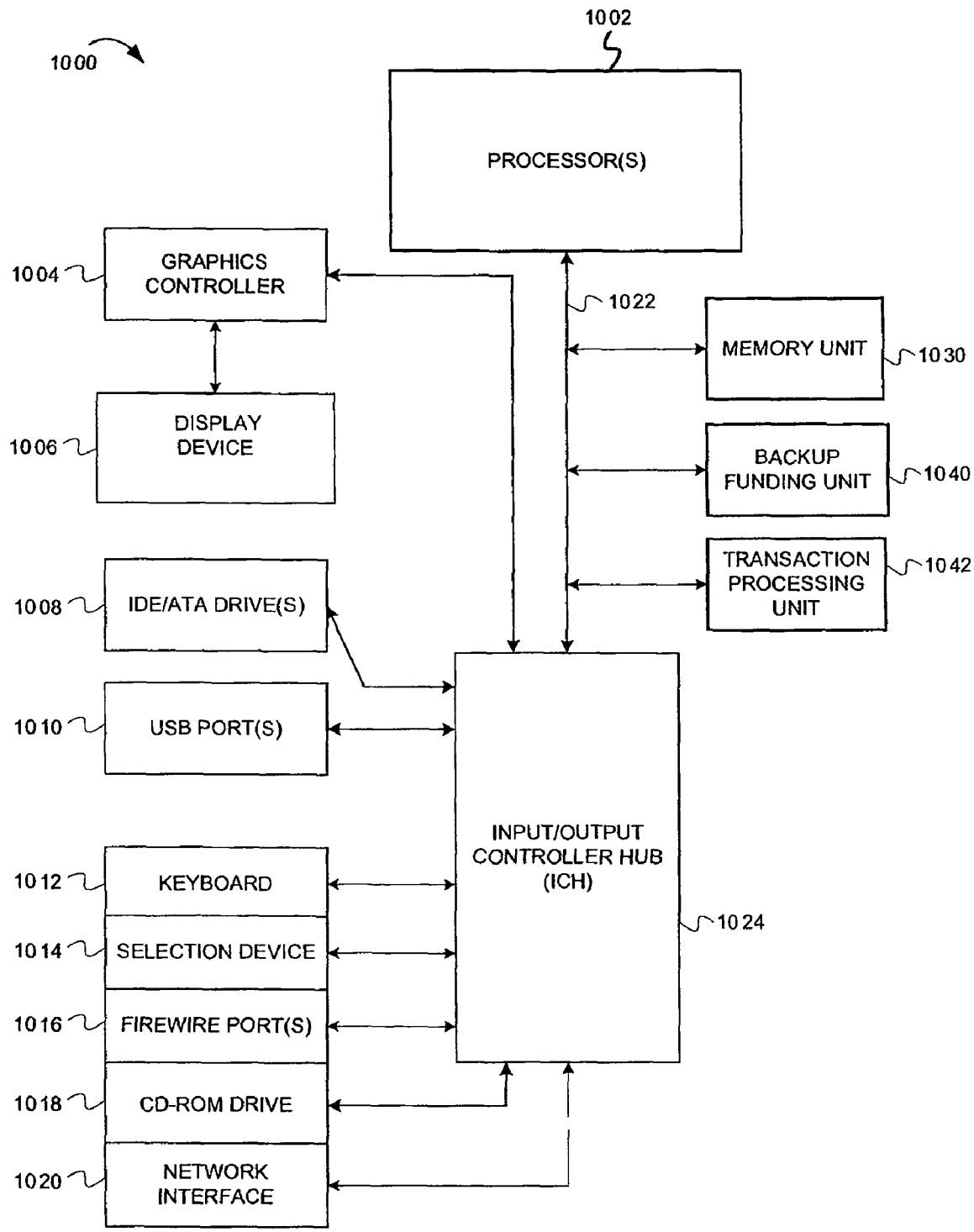
FIG. 10 illustrates an exemplary computer system used in conjunction with certain embodiments of the invention.

FIG. 10 illustrates a computer architecture, according to example embodiments of the invention. In FIG. 10, computer system 1000 comprises processor(s) 1002, memory unit 1030, processor bus 1022, and Input/Output controller hub (ICH) 1024. The processor(s) 1002, memory unit 1030, and ICH 1024 are coupled to the processor bus 1022. The processor(s) 1002 may comprise any suitable processor architecture. The computer system 1000 may comprise one, two, three, or more processors, any of which may execute a set of instructions in accordance with embodiments of the present invention.

The memory unit 1030 stores data and/or instructions, and may comprise any suitable memory, such as a dynamic random access memory (DRAM), for example. The computer system 1000 also includes IDE drive(s) 1008 and/or other suitable storage devices. A graphics controller 1004 controls the display of information on a display device 1006, according to embodiments of the invention.

The input/output controller hub (ICH) 1024 provides an interface to I/O devices or peripheral components for the computer system 1000. The ICH 1024 may comprise any suitable interface controller to provide for any suitable communication link to the processor(s) 1002, memory unit 1030 and/or to any suitable device or component in communication with the ICH 1024. For one embodiment of the invention, the ICH 1024 provides suitable arbitration and buffering for each interface.

For one embodiment of the invention, the ICH 1024 provides an interface to one or more suitable integrated drive electronics (IDE) drives 1008, such as a hard disk drive (HDD) or compact disc read only memory (CD ROM) drive, or to suitable universal serial bus (USB) devices through one or more USB ports 1010. For one embodiment, the ICH 1024 also provides an interface to a keyboard 1012, a mouse 1014, a CD-ROM drive 1018, one or more suitable devices through one or more firewire ports 1016. For one embodiment of the invention, the ICH 1024 also provides a network interface 1020 though which the computer system 1000 can communicate with other computers and/or devices.

In one embodiment, the computer system 1000 includes a machine-readable medium that stores a set of instructions (e.g., software) embodying any one, or all, of the methodologies for configuring and providing backup funding for financial transactions. Furthermore, software can reside, completely or at least partially, within memory unit 1030 and/or within the processor(s) 1002.

General

This description describes numerous details about the embodiments. However, some embodiments can be practiced without these details. In some instances, this description has left-out well-known circuits, structures, and techniques in order to not obscure embodiments of the invention. In this description, references to "one embodiment" or "an embodiment" mean that the feature being referenced is included in at least one embodiment of the invention. Separate references to "one embodiment" do not necessarily refer to the same embodiment and the embodiments are not mutually exclusive, unless so stated. Thus, the present invention can include any variety of combinations of the embodiments described herein.

What is claimed is:

1. A computer-implemented method comprising:
configuring at least one different backup funding source for each of a plurality of debit cards;
receiving a request to fund a transaction associated with a debit card of a consumer, wherein the debit card is issued by a first institution;
funding the transaction using funds from an account associated with at least one of a second institution or a third institution; and
enabling the consumer associated with the debit card to select whether the funds used to fund the transaction are from either or both of the second institution and the third institution, at transaction time.

2. The computer-implemented method of claim 1, wherein the account associated with the second institution or the third institution is a checking account, a savings accounts or a credit line.

3. The computer-implemented method of claim 2, wherein the second institution or the third institution is a bank.

4. The computer-implemented method of claim 1, wherein the transaction is associated with an automated teller machine (ATM), a merchant computer, or a workstation.

5. A system comprising:
an account server associated with a debit card issuing institution, the account server to configure at least one different backup funding source for each of a plurality of debit cards, to store information about a debit account of a consumer and to receive a request to fund a debit amount associated with a debit card of the consumer, the debit account associated with the debit card, the debit card issued by the debit card issuing institution;
a funding server coupled to the account server, the funding server to fund the debit amount using funds from at least one of a first financial institution or a second financial institution; and
wherein the account server enables the consumer to select whether the debit amount is to be funded using the funds from either or both of the first financial institution and the second financial institution, at transaction time.

6. The system of claim 5, wherein the account server comprises:
an account information unit to store information about the debit account of the consumer; and
a transaction processor coupled to the account information unit to receive the request to fund the debit amount.

7. The system of claim 6, wherein the information about the debit account of the consumer includes at least one of name, address or telephone number of the consumer.

8. The system of claim 7, wherein the information about the debit account of the consumer includes information about one or more financial accounts associated with at least one of the first financial institution or the second financial institution.

9. The system of claim 8, wherein the one or more financial accounts includes a checking account or a savings account.

10. The system of claim 6, wherein the transaction processor receives the request to fund the debit amount from a merchant computer coupled to the account server via a communication network.

11. The system of claim 10, wherein the communication network includes one or more of wired and wireless links.

12. The system of claim 6, wherein the transaction processor receives the request to fund the debit amount from an automated teller machine (ATM).

13. The system of claim 6, wherein the account server further comprises a funding unit to determine whether the debit amount is to be funded using funds from either or both of the first financial institution and the second financial institution.

14. The system of claim 6, wherein the debit card issuing institution is different from the first and the second financial institutions.

15. An apparatus comprising:
an account information unit associated with a debit card issuing institution to store information about debit card accounts of debit cards issued by the debit card issuing institution and to configure at least one different backup funding source for each of the debit cards;
a transaction processor coupled to the account information unit to receive requests for funds associated with one or more of the debit card accounts and to determine one or more funding institutions associated with the one or more debit card accounts; and
a funding unit coupled to the transaction processor to provide funds from the one or more funding institutions, wherein the funding unit enables a consumer associated with one of the debit cards to select whether the requests for funds are to be funded using funds from any one or more of the one or more funding institutions, at transaction time.

16. The apparatus of claim 15, wherein the transaction processor determines the one or more funding institutions associated with the one or more debit card accounts using the information stored by the account information unit.

17. The apparatus of claim 16, wherein the funding unit is to request for authorization for the funds and to receive a response to the request for authorization for the funds from the one or more funding institutions.

18. The apparatus of claim 17, wherein, based on the response received from the one or more funding institutions, the transaction processor is to transmit an authorization or a denial in response to the requests for the funds.

19. The apparatus of claim 18, wherein the requests for the funds are received from one or more of merchant computers, automated teller machines (ATMs), or online retail servers.

20. A computer implemented method comprising:
configuring at least one different backup funding source for each of a plurality of debit cards, the debit cards including a debit card issued to a consumer, the debit card associated with a debit card account and issued by a debit card issuing institution;
storing information about the debit card account;
receiving a request for funds from the debit card account;
determining one or more funding sources associated with the debit card account;
transmitting an authorization or a denial to the request for funds from the debit card account, wherein the one or more funding sources are from one or more financial institutions other than the debit card issuing institution; and
enabling the consumer to select whether the funds used to fund the request for funds are funds from any one or more of the one or more funding institutions, at transaction time.

21. The computer implemented method of claim 20, wherein said determining the one or more funding sources associated with the debit card account is performed using the stored information about a debit card account.

22. The computer implemented method of claim 21, wherein the stored information about a debit card account includes account holder's name, address and telephone number.

23. The computer implemented method of claim 21, further comprising:
requesting for authorization for the funds from the one or more financial institutions; and
receiving a response to the request for the authorization for the funds from the one or more financial institutions, wherein the response is either the authorization or the denial.

24. The computer implemented method of claim 23, wherein the funds from the one or more financial institutions include funds from one or more of a banking account, a savings account, and a credit line.

25. The computer implemented method of claim 24, wherein the request for the funds from the debit card account is received from a merchant computer, an automated teller machine (ATM), or an online retail server.

26. A computer-readable medium comprising instructions, which when executed by one or more processors, perform the following operations:
configuring at least one different backup funding source for each of a plurality of debit cards, the debit cards including a debit card issued to a consumer, the debit card associated with a debit card account and issued by a debit card issuing institution;
storing information about the debit card account;
receiving a request to fund a debit transaction associated with the debit card account;
determining one or more financial institutions to fund the debit transaction using the stored information about the debit card account;
requesting for authorization to fund the debit transaction from the one or more financial institutions;
after receiving a response to said requesting for the authorization from the one or more financial institutions, transmitting an authorization or a denial to respond to the request to fund the debit transaction; and
enabling the consumer to select whether the funds used to fund the debit transaction are funds from any one or more of the one or more funding institutions, at transaction time.

27. The computer-readable medium of claim 26, further comprising:

when the debit transaction is authorized by the one or more financial institutions, funding the debit transaction using funds from the one or more financial institutions.

28. The computer-implemented method of claim 1, wherein at least one of the funds associated with the second institution or third institution is specified with a maximum backup funding limit.

29. The system of claim 5, wherein at least one of the funds associated with the first financial institution or the second financial institution is specified with a maximum backup funding limit.

30. The apparatus of claim 15, wherein at least one of the funds associated with the one or more funding institutions is specified with a maximum backup funding limit.

31. The computer implemented method of claim 20, wherein at least one of the one or more funding sources is specified with a maximum backup funding limit.

* * * * *